(12) United States Patent
Merz et al.

(10) Patent No.: US 11,375,089 B2
(45) Date of Patent: Jun. 28, 2022

(54) CAMERA SYSTEM

(71) Applicant: HENSOLDT Optronics GmbH, Oberkochen (DE)

(72) Inventors: Simon Merz, Aalen (DE); Oliver Ziegler, Westhausen (DE)

(73) Assignee: HENSOLDT OPTRONICS GMBH, Oberkochen (DE)

( * ) Notice: Subject to any disclaimer, the term of this patent is extended or adjusted under 35 U.S.C. 154(b) by 0 days.

(21) Appl. No.: 16/980,116

(22) PCT Filed: Mar. 11, 2019

(86) PCT No.: PCT/EP2019/056044
§ 371 (c)(1),
(2) Date: Sep. 11, 2020

(87) PCT Pub. No.: WO2019/175114
PCT Pub. Date: Sep. 19, 2019

(65) Prior Publication Data
US 2021/0029278 A1    Jan. 28, 2021

(30) Foreign Application Priority Data
Mar. 13, 2018    (DE) .................... 10 2018 105 740.7

(51) Int. Cl.
*H04N 5/225*    (2006.01)
*B60R 11/04*    (2006.01)
*B64D 47/08*    (2006.01)

(52) U.S. Cl.
CPC ......... *H04N 5/2253* (2013.01); *H04N 5/2252* (2013.01); *H04N 5/22521* (2018.08); *B60R 11/04* (2013.01); *B64D 47/08* (2013.01)

(58) Field of Classification Search
CPC ............ H04N 5/2253; H04N 5/22521; H04N 5/2252; B60R 11/04; B64D 47/08; G03B 17/16
See application file for complete search history.

(56) References Cited

U.S. PATENT DOCUMENTS

| | | | | |
|---|---|---|---|---|
| 4,780,739 A | * | 10/1988 | Kawakami | ........... G02B 27/646 348/208.99 |
| 2014/0368911 A1 | * | 12/2014 | Becker | .................. G02B 23/18 359/554 |

(Continued)

FOREIGN PATENT DOCUMENTS

| | | |
|---|---|---|
| DE | 199 06 692 C1 | 12/2000 |
| DE | 10 2011 004 445 A1 | 9/2012 |

(Continued)

OTHER PUBLICATIONS

Written Opinion corresponding to PCT Application No. PCT/EP2019/056044 dated Apr. 30, 2019.

(Continued)

*Primary Examiner* — Sinh Tran
*Assistant Examiner* — Zhenzhen Wu
(74) *Attorney, Agent, or Firm* — Finch & Maloney, PLLC; Michael J. Bujold; Jay S. Franklin

(57) ABSTRACT

A camera system (1, 1') which includes a housing (2); and an optoelectronic sensor unit (3), arranged in the housing (2), which has at least one detector device (4) and at least one optical unit (5), connected upstream of the at least one detector device (4). The optoelectronic sensor unit (3) is elastically mounted in relation to the housing (2). At least one elastic mounting device (6.1-6.7) is formed from multiple ring segments (6.10-6.70) arranged spaced apart from one another.

15 Claims, 7 Drawing Sheets

(56) References Cited

U.S. PATENT DOCUMENTS

2018/0020136 A1\* 1/2018 Wei ..................... H04N 5/2259
2020/0195850 A1\* 6/2020 Hu ...................... H04N 5/23287
2020/0230663 A1\* 7/2020 McBride ............ H04N 5/23248

FOREIGN PATENT DOCUMENTS

| GB | 2488419 | | 12/2015 |
|---|---|---|---|
| JP | 2003335180 | A | 11/2003 |
| JP | 2014192605 | A | 10/2014 |
| WO | 2017119302 | A1 | 7/2017 |

OTHER PUBLICATIONS

International Search Report corresponding to PCT Application No. PCT/EP2019/056044 dated Apr. 30, 2019.
German Search corresponding to German Application Serial No. 10 2018 105 740.7 dated Oct. 29, 2018.

\* cited by examiner

CAMERA SYSTEM

This application is a national stage completion of PCT/EP2019/056044 filed Mar. 11, 2019 which claims priority from German Application No. 10 2018 105 740.7 filed Mar. 13, 2018.

FIELD OF THE INVENTION

The invention relates to a camera system comprising a housing and an optronic sensor unit arranged in the housing.

BACKGROUND OF THE INVENTION

High demands with respect to the optical lines of sight of the cameras and with respect to the temperature usage range are placed on cameras for aircraft, for example, aircraft having jet engines. When camera systems are used in aircraft, high levels of environmental stress are given due to pressure differences and temperature differences. High vibration loads or acceleration loads can occur, which have the result that either parts or components of the cameras are damaged or the above-mentioned high requirements with respect to the lines of sight can no longer be met. Camera systems mentioned at the outset can be arranged in different positions on the aircraft. Cameras can also be arranged here in the region of the engines. Particularly strong vibrations and oscillations occur here, which act on the camera and its components, in particular the optronic or optoelectronic sensor unit having an optical unit and a detector device. The sensor or the detector of the camera is particularly sensitive in this regard. It is additionally very unfavorable if the natural resonance frequency of the camera is in the range of the excitation frequency by the aircraft. The introduced oscillations or accelerations can be multiplied in this way, so that a resonance catastrophe occurs.

This is made more difficult in addition because such cameras have to have a compact structure, since in aviation the installation space available is generally very limited. A use of thicker or stronger housing walls or corresponding reinforcements therefore frequently does not come into consideration in the cameras.

SUMMARY OF THE INVENTION

Proceeding therefrom, the present invention is based on the object of improving a camera system of the type mentioned at the outset, wherein in particular externally introduced high acceleration and/or oscillation loads can act on the camera, without damage occurring to the camera or its components, and without the optical line of sight of the camera being impaired.

This object is achieved according to the invention by a camera system, in particular for vehicles or aircraft, comprising:
  a housing; and
  an optoelectronic sensor unit arranged in the housing having at least one detector device and at least one optical unit connected upstream of the at least one detector device, wherein the optoelectronic sensor unit is elastically mounted or suspended in relation to the housing.

An oscillatory isolation of a camera system or optical system, consisting of a detector of an optical unit, is provided by means of an elastic suspension of this optical unit in relation to the camera housing. The camera system can be, for example, a thermal imaging device or an infrared camera. Due to the elastic mounting of the optoelectronic sensor unit in relation to the housing, higher loads can be introduced into the camera without damage occurring to the camera or its components or the detector. Due to the reduced loads on the detector, the tilt of the line of sight under vibration excitation is also reduced. The mean time between failures (MTBF) is also increased due to the reduction of the loads introduced into the camera. Therefore, at least one means is provided for reduction of externally introduced mechanical oscillations or vibrations acting on the camera and/or its components.

The optoelectronic sensor unit can thus form a resonator. Due to the isolation, a low-frequency decoupling of the internal optical system from the external excitation can be achieved and the introduced acceleration loads can be reduced to a minimum by the decoupling and the material damping of the elastomer. Due to the low-frequency decoupling, the resonator can be operated in the supercritical frequency range. In contrast to a known decoupling of mechanical oscillations, in which a complete device, for example, a machine tool, is decoupled from the excitation, due to the decoupling of the oscillations within the camera, the camera housing can be screwed on fixedly, in particular on an aircraft. The interface of the camera to the aircraft thus does not have to be changed. During the operation of the resonator in the supercritical frequency range, the excitation frequency is significantly above the resonance frequency, wherein a damping takes place at, for example, 10 dB per octave. At least 25 to 30% of the mass of the entire device can thus be decoupled advantageously from the oscillations acting on the device. Better utilization of the available installation space and a lower total mass is thus possible, which is of great significance upon use in aircraft. Due to the low-frequency decoupling or tuning of the resonator by the elastic or soft suspension, the maximum amplitude of the oscillating system shifts, wherein the frequencies lying above this are strongly damped. The operation essentially takes place above the resonance frequency of the resonator. A particularly high isolation effect is achieved in the case of high-frequency oscillations, as occur, for example, in aircraft having jet engines, by the low-frequency tuning of the resonator.

The optoelectronic sensor unit can be connected to the housing via at least two elastic mounting devices, which are ring-shaped in particular.

The elastic mounting devices can have elastomer elements, for example, made of rubber, which are in particular arranged between metal parts and/or connect them to one another.

A first elastic mounting device, which is ring-shaped in particular, can connect the optoelectronic sensor unit to the housing in the region of the at least one optical unit. A second elastic mounting unit, which is ring-shaped in particular, can connect the optoelectronic sensor unit to the housing in the region of the at least one detector device.

It is very advantageous if the elastic mounting devices, which are ring-shaped in particular, are designed or have an internal geometry such that they have essentially equal or identical rigidity and/or damping in all three spatial directions.

The elastic mounting devices can have an internal geometry which enables a nearly identical rigidity in all three spatial directions. The natural frequencies of the resonator are thus equal in all three spatial directions. Upon excitation by vibration loads, the relative movements of the optoelectronic sensor unit with the detector and the associated optical unit are at most sufficiently large that influencing of the optical performance is precluded.

The elastic mounting devices can be embodied as ring-shaped.

The ring-shaped elastic mounting devices each comprise at least the following:
- a metallic inner ring, which is arranged on the optoelectronic sensor unit;
- a metallic outer ring, which is arranged on the housing; and
- a ring-shaped elastomer element, formed from rubber in particular, and via which the metallic inner ring is connected to the metallic outer ring.

The essentially equal or identical rigidity and/or damping in all three spatial directions can advantageously be achieved by such rubber-metal elastomer combinations.

The ring-shaped elastomer element can be fastened by means of vulcanization or vulcanized on the metallic inner ring and/or on the metallic outer ring.

An image plane of the at least one optical unit can lie at least approximately in the region of the center of gravity of the optoelectronic sensor unit. The optical unit can thus be designed in such a way that its relative movements have a negligible influence on the accuracy of the line of sight in the event of an oscillation excitation due to its elastic mounting.

The center of gravity of the optoelectronic sensor unit can lie on the optical axis of the optical unit at least approximately in the middle between the first elastic mounting device and the second elastic mounting device, which is ring-shaped in particular.

At least one elastic mounting device can be provided, via which the optoelectronic sensor unit is connected, in particular directly, to the housing or to a preferably ring-shaped holding device, which is in turn connected to the housing. The optoelectronic sensor unit can thus be decoupled from mechanical oscillations. If only one elastic mounting device is provided, it could advantageously be arranged in the region of the center of gravity of the optoelectronic sensor unit.

It is advantageous if at least one elastic mounting device is formed from multiple ring segments arranged spaced apart and/or separate from one another.

At least one elastic mounting device can be formed by three, four, six, eight, nine, or twelve ring segments arranged adjacent spaced apart and/or separate from one another.

Alternatively to a circumferential and uninterrupted cross section of the elastic mounting device or the rubber-metal element, the actual decoupling element can be divided into individual elements or segments. The spring rigidity of this decoupling and thus the natural frequency of the resonator can be changed by the use of different numbers of these elements or segments. For example, in particular symmetrical arrangements of the segments having numbers of three, four, six, eight, nine, or twelve segments can be used. This can correspond to a change range of the spring rigidity by a factor of 4, which is equivalent to a change of the natural frequency by a factor of 2.

The ring segments of the at least one elastic mounting device can be arranged in multiple groups, preferably of two or three ring segments. In this case, the uniform intervals between the individual ring segments of a respective group can be less than the intervals between the groups of ring segments.

The ring segments can each comprise at least the following:
- a metallic inner ring segment, which is arranged on the optoelectronic sensor unit;
- a metallic outer ring segment, which is arranged on the housing and/or on the ring-shaped holding device connected to the housing; and
- an elastomer ring segment, formed from rubber in particular, via which the metallic inner ring segment is connected to the metallic outer ring segment.

A pre-tension of the ring-shaped elastomer element or the elastomer ring segment can be variably settable.

The pre-tension can be variably settable by means of a changeable compression of the ring-shaped elastomer element or the elastomer ring segment in the longitudinal direction with respect to its cross section.

By way of the change of the pre-tension of the elastomer by its compression in its longitudinal direction, a change of the spring stiffness by the factor of 2 can once again be achieved, which once again corresponds to a factor of 1.4 in the natural frequency. The compression of the elastomer in its longitudinal direction ensures a nearly uniform change of axial and radial rigidity of the resonator. The setting can take place in such a way that the change of the rigidity is approximately equal in both the axial direction and also the radial direction.

A rigidity or spring rigidity of the elastic mounting device can be adjustable in such a way that a synchronous change takes place in the radial direction and in the axial direction by at least approximately the same amount.

The at least one elastic mounting device can be arranged between the ring-shaped holding device and a first threaded ring for fixation.

A second threaded ring can be displaceably arranged between the ring-shaped holding device and the first threaded ring, by means of which the metallic outer ring or the metallic outer ring segment is displaceable along an inner contour of the ring-shaped holding device in such a way that the pressure exerted on the ring-shaped elastomer element or the elastomer ring segment is changeable in the longitudinal direction with respect to its cross section.

The second threaded ring can comprise an external thread and an internal thread, which have different rotational directions. For example, the external thread can be embodied as a right-hand thread and the internal thread as a left-hand thread or vice versa.

The ring segments or the groups of ring segments can be arranged at uniform intervals along an internal diameter or an internal circumferential line of the ring-shaped holding device. Furthermore, they can be arranged axially symmetrical or point symmetrical.

BRIEF DESCRIPTION OF THE DRAWINGS

Advantageous designs and refinements of the invention result from the dependent claims. One exemplary embodiment of the invention is described in principle hereinafter on the basis of the drawing In the figures:

DETAILED DESCRIPTION OF THE EMBODIMENTS

Functionally identical elements are provided with the same reference signs in the figures.

Figure 1:
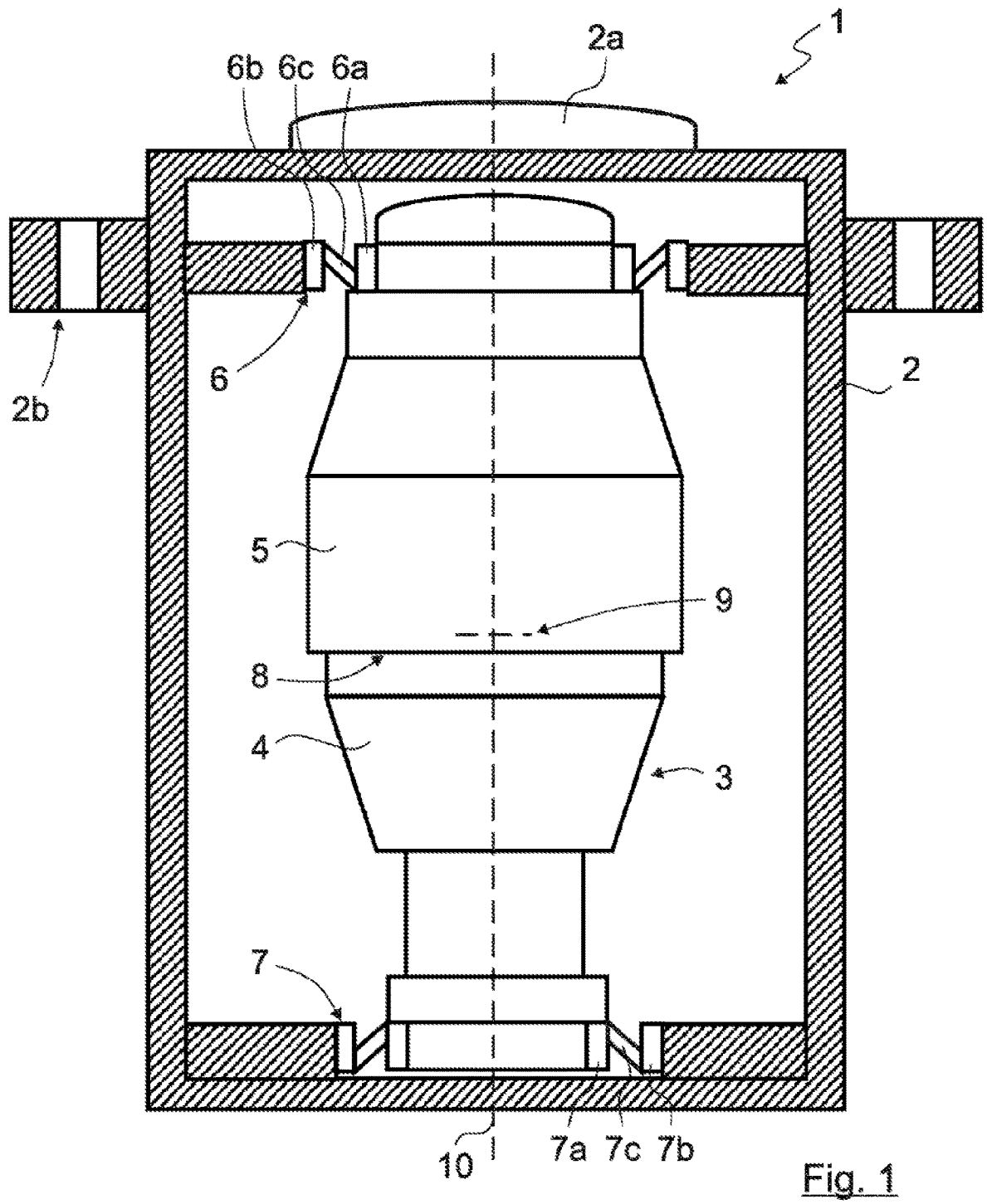
FIG. 1 shows a simplified sectional illustration of a camera system according to the invention.

FIG. 1 shows a camera system 1 according to the invention comprising a housing 2 and an optoelectronic sensor unit 3 arranged in the housing 2 having at least one detector device 4 and at least one optical unit 5 connected upstream of the at least one detector device 4, wherein the optoelectronic sensor unit 3 is elastically suspended or mounted in relation to the housing 2. The housing 2 furthermore has a window 2a and an interface 2b, for example, for installation on a vehicle or aircraft.

The optoelectronic sensor unit 3 is connected via at least two elastic mounting devices 6, 7 to the housing 2. In the present exemplary embodiment, the two elastic mounting devices 6, 7 are embodied as ring-shaped or circumferential. In further exemplary embodiments (not shown), however, still other approaches are conceivable.

As is apparent from FIG. 1, at least one first elastic mounting device 6 connects the optoelectronic sensor unit 3 to the housing 2 in the region of the at least one optical unit 5. At least one second elastic mounting device 7 connects the optoelectronic sensor unit 3 to the housing 2 in the region of the at least one detector device 4. As is furthermore apparent from FIG. 1, an image plane 8, which is indicated in simplified form, of the at least one optical unit 5 is at least approximately in the region of the center of gravity 9 of the optoelectronic sensor unit 3 (indicated greatly simplified).

The optoelectronic sensor unit 3 thus forms a resonator.

The center of gravity 9 of the optoelectronic sensor unit 3 lies on an optical axis 10 (indicated by dashed line) of the optical unit 5 at least approximately in the center between the at least one first elastic mounting device 6 and the at least one second elastic mounting device 7. The distance between the center of gravity 9 and the first elastic mounting device 6 along the optical axis 10 thus essentially corresponds to the distance between the center of gravity 9 and the second elastic mounting device 7 along the optical axis 10.

The ring-shaped elastic mounting devices 6, 7 each have the following:
- a metallic inner ring 6a, 7a, which is arranged on the optoelectronic sensor unit 3;
- a metallic outer ring 6b, 7b, which is arranged on the housing 2; and
- a ring-shaped elastomer element 6c, 7c, formed from rubber in particular, and via which the metallic inner ring 6a, 7a is connected to the metallic outer ring 6b, 7b.

The ring-shaped elastomer element 6c, 7c is vulcanized or fastened by means of vulcanization on the metallic inner ring 6a, 7a and/or on the metallic outer ring 6b, 7b.

Figure 2:
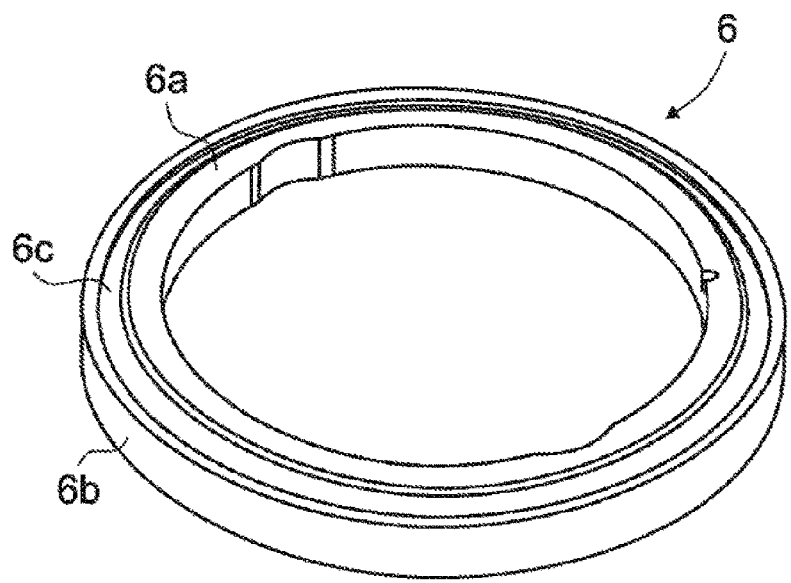
FIG. 2 shows a perspective view of a first ring-shaped elastic mounting device.
Figure 3:
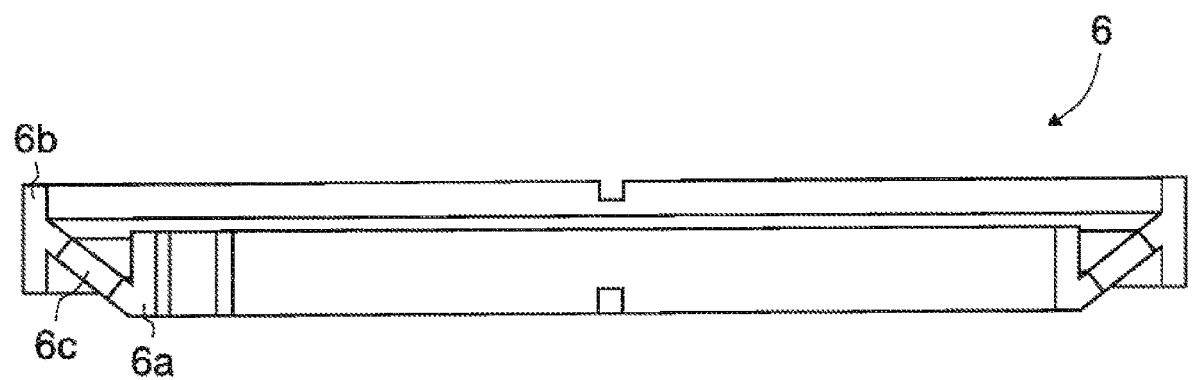
FIG. 3 shows a simplified sectional view of the first ring-shaped elastic mounting device from FIG. 2.
Figure 4:
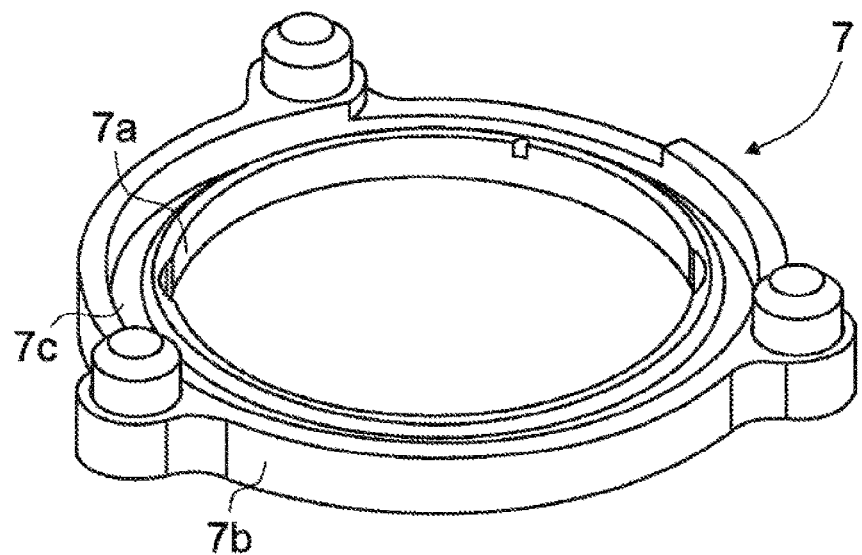
FIG. 4 shows a perspective illustration of a second ring-shaped elastic mounting device.
Figure 5:
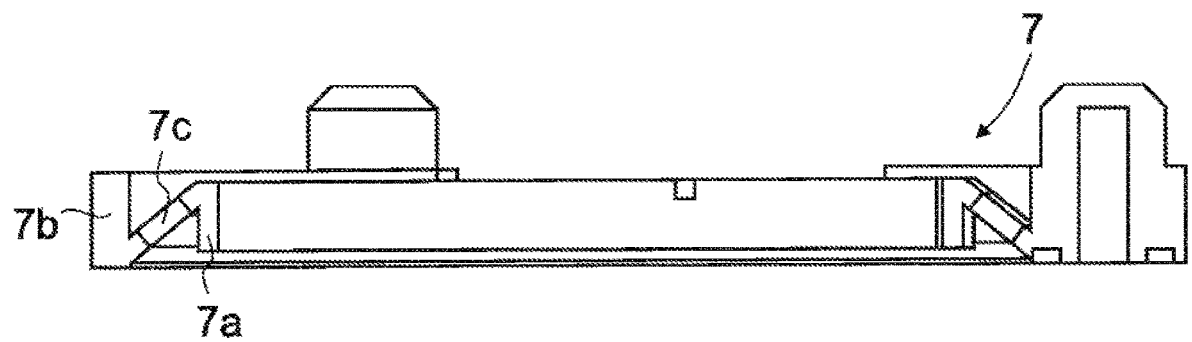
FIG. 5 shows a simplified sectional view of the second ring-shaped elastic mounting device from FIG. 4.

In FIGS. 2 and 3, the first elastic mounting device 6 having the metallic inner ring 6a, the metallic outer ring 6b, and the elastomer element 6c is shown in perspective and in a simplified sectional view. FIGS. 4 and 5 show an essentially identically embodied second elastic mounting device 7 having the metallic inner ring 7a, the metallic outer ring 7b, and the ring-shaped elastomer element 7c, also in a perspective illustration and in a simplified sectional illustration.

Figure 6:
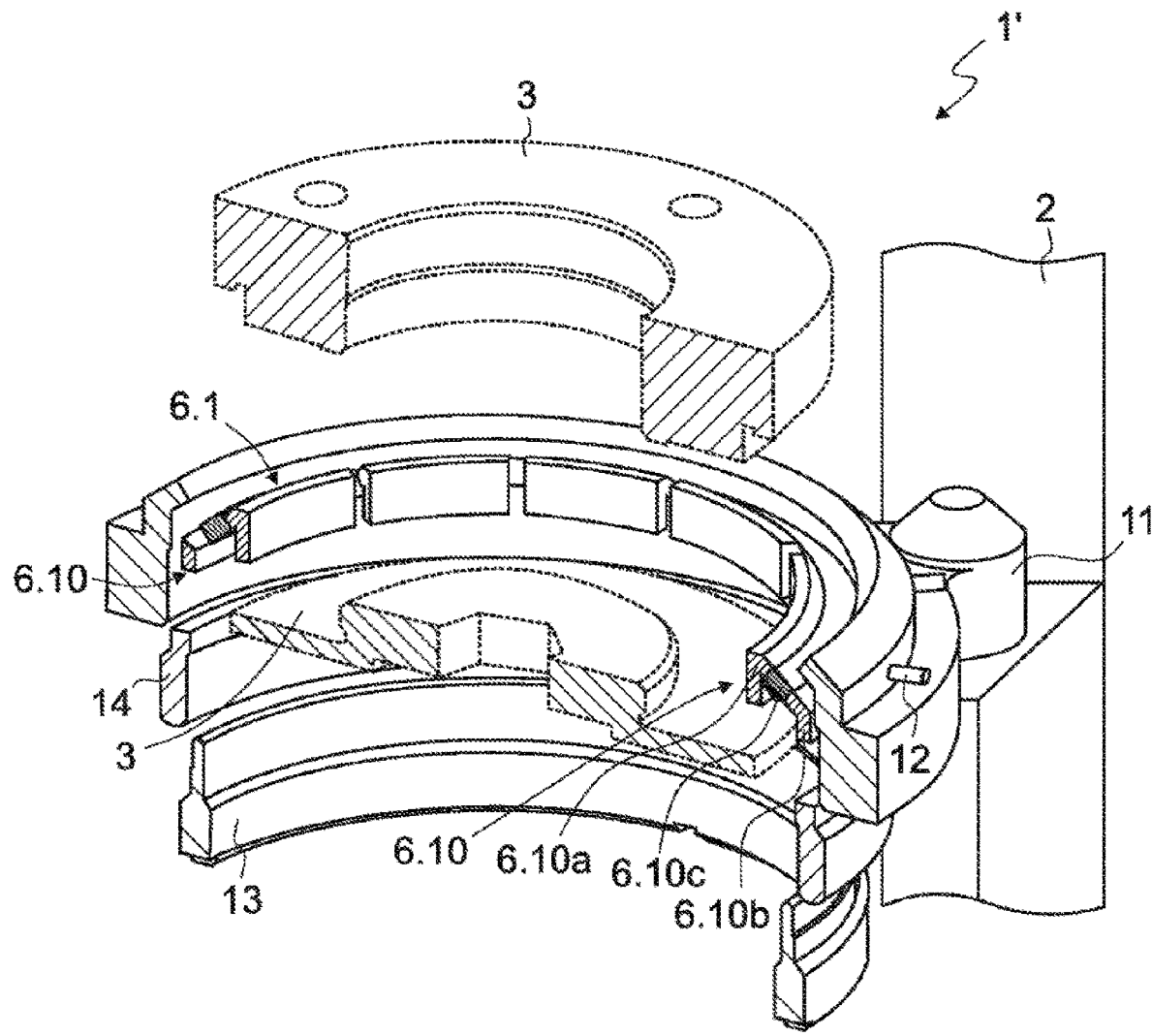
FIG. 6 shows a perspective exploded view in section of a further embodiment of the camera system according to the invention.

FIG. 6 shows a further embodiment of a camera system 1' according to the invention comprising a housing 2 indicated by dashed lines and an optoelectronic sensor unit 3 (indicated by dashed lines) arranged in the housing 2, having at least one detector device and at least one optical unit (not shown in FIG. 6) connected upstream of the at least one detector device, wherein the optoelectronic sensor unit 3 is elastically suspended or mounted in relation to the housing 2.

The optoelectronic sensor unit 3 is connected via an elastic mounting device 6.1 to a preferably ring-shaped holding device 11, which is in turn connected to the housing 2. In the present exemplary embodiment, the elastic mounting device 6.1 is formed from multiple ring segments 6.10 arranged spaced apart from one another. Pins 12, which engage in oblong holes (not shown in greater detail) of the ring segments 6.10, are provided for rotational securing or fixation. Of course, the optoelectronic sensor unit 3 could additionally be connected via at least one further elastic mounting device to the housing 2 or to a preferably ring-shaped holding device, which is in turn connected to the housing 2.

The ring segments 6.10 each comprise at least the following:
- a metallic inner ring segment 6.10a, which is arranged on the optoelectronic sensor unit 3;
- a metallic outer ring segment 6.10b, which is arranged on the housing 2 or on the ring-shaped holding device 11 connected to the housing 2; and
- an elastomer ring segment 6.10c, formed from rubber in particular, via which the metallic inner ring segment 6.10a is connected to the metallic outer ring segment 6.10b.

Figure 7:
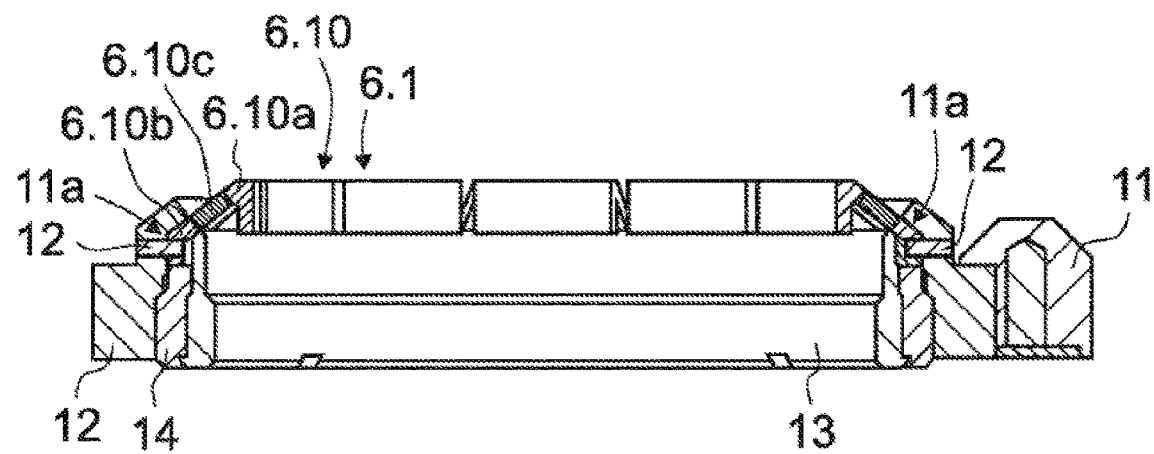
FIG. 7 shows a simplified first sectional view of a part of the embodiment according to FIG. 6.
Figure 8:
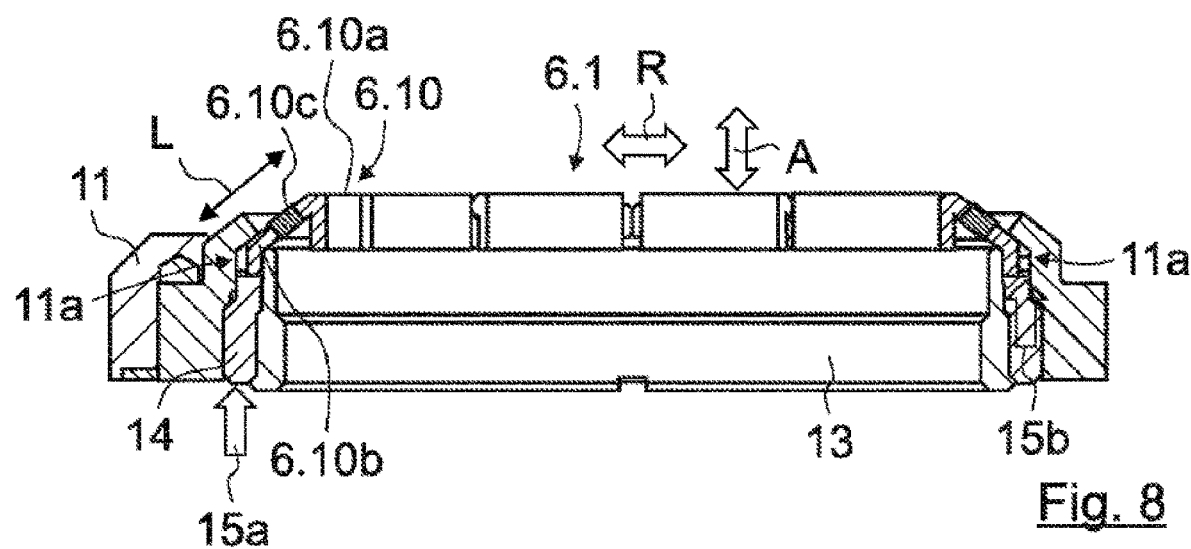
FIG. 8 shows a simplified second sectional view of a part of the embodiment according to FIG. 6.

As is apparent from FIGS. 7 and 8, a pre-tension of the elastomer ring segment 6.10c of the elastic mounting device 6.1 can be variably settable. It is also possible to provide it with the required changes in the ring-shaped elastomer elements 6c, 7c according to FIGS. 1-5 (not shown).

The pre-tension is variably settable by means of a changeable compression of the ring-shaped elastomer element 6c, 7c or the elastomer ring segment 6.10c in the longitudinal direction L with respect to its cross section.

As is apparent from FIGS. 6 to 8, the at least one elastic mounting device 6.1 is arranged between the ring-shaped holding device 11 and a first threaded ring 13 for fixing or locking, in particular after setting the pre-tension.

A second threaded ring 14 is displaceably arranged between the ring-shaped holding device 11 and the first threaded ring 13, by means of which the metallic outer ring 6b, 7b (not shown) or the metallic outer ring segment 6.10b is displaceable along an inner contour 11a of the ring-shaped holding device 11 such that the pressure exerted on the ring-shaped elastomer element 6c, 7c or the elastomer ring segment 6.10c is changeable in the longitudinal direction L with respect to its cross section. Arrows 15a, 15b indicate an insertion of the second threaded ring 14, for example, by 0.5 mm. The setting can take place in such a way that the change of the rigidity is at least approximately equal both in the axial direction (indicated by an arrow A) and also in the radial direction (indicated by an arrow R).

The second threaded ring 14 can comprise an external thread and an internal thread, which have different rotational directions. For example, the external thread can be embodied as a right-hand thread and the internal thread as a left-hand thread or vice versa.

FIGS. 9-14 show further embodiments of elastic mounting devices 6.2-6.7, the ring segments 6.20-6.70 of which can have the same structure as the ring segments 6.10 from FIGS. 6, 7, and 8.

Figure 9:
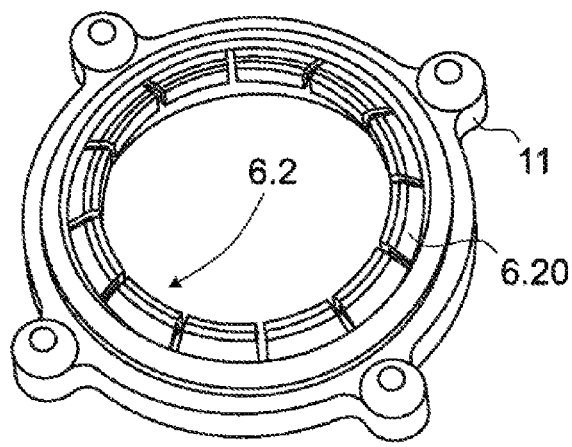
FIGS. 9-14 show simplified perspective illustrations of further embodiments of elastic mounting devices.

The embodiment of an elastic mounting device 6.2 shown in FIG. 9 has twelve ring segments 6.20, which are arranged at uniform intervals along an internal diameter or an internal circumferential line of the ring-shaped holding device 11

Figure 10:
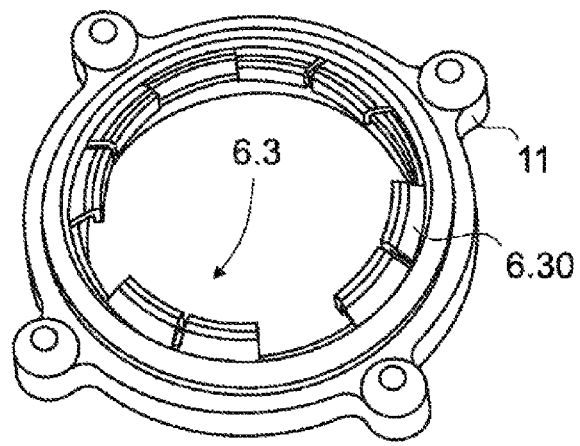

The embodiment of an elastic mounting device 6.3 shown in FIG. 10 has eight ring segments 6.30, which are arranged in groups of two ring segments 6.30 each at uniform intervals along the internal diameter or the internal circumferential line of the ring-shaped holding device 11.

Figure 11:
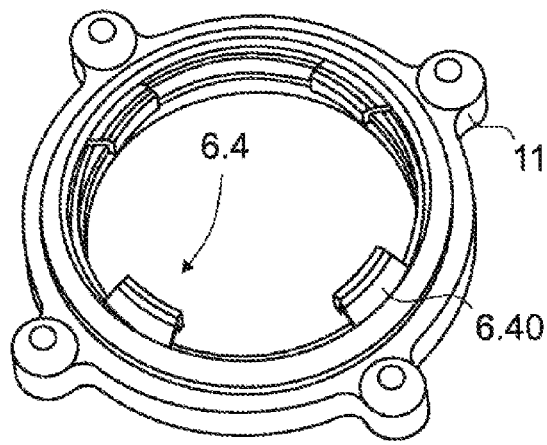

The embodiment of an elastic mounting device 6.4 shown in FIG. 11 has four ring segments 6.40, which are arranged at uniform intervals along the internal diameter or the internal circumferential line of the ring-shaped holding device 11.

Figure 12:
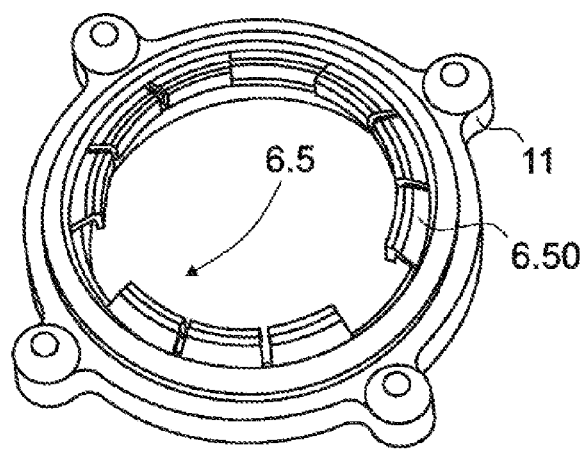

The embodiment of an elastic mounting device 6.5 shown in FIG. 12 has nine ring segments 6.50, which are arranged in groups of three ring segments 6.50 each at uniform intervals along the internal diameter or the internal circumferential line of the ring-shaped holding device 11.

Figure 13:
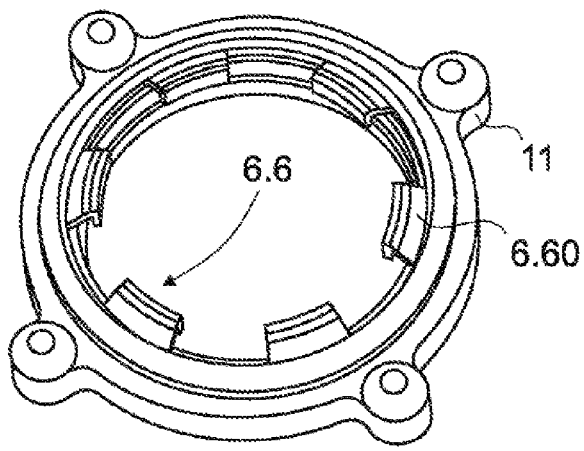

The embodiment of an elastic mounting device 6.6 shown in FIG. 13 has six ring segments 6.60, which are arranged at uniform intervals along the internal diameter or the internal circumferential line of the ring-shaped holding device 11.

Figure 14:
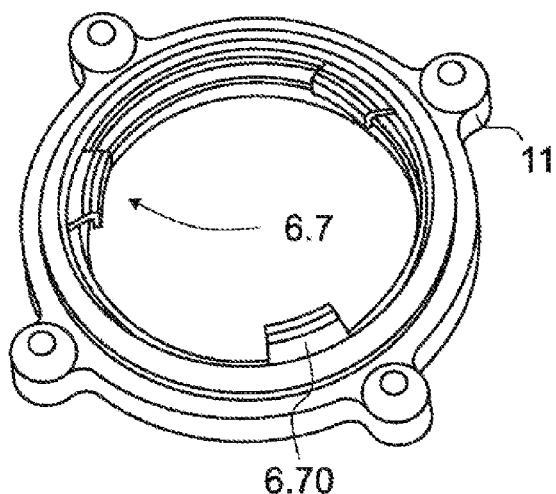

The embodiment of an elastic mounting device 6.7 shown in FIG. 14 has three ring segments 6.70, which are arranged at uniform intervals along the internal diameter or the internal circumferential line of the ring-shaped holding device 11.

LIST OF REFERENCE SIGNS

1, 1' camera system
2 housing
2*a* window
2*b* interface
3 optoelectronic sensor unit
4 detector device
5 optical unit
6 first elastic mounting device
7 second elastic mounting device
6*a*, 7*a* inner ring
6*b*, 7*b* outer ring
6*c*, 7*c* elastomer element
6.1-6.7 elastic mounting device
6.10-6.70 ring segments
6.10*a* inner ring segment
6.10*b* outer ring segment
6.10*c* elastomer ring segment
8 image plane
9 center of gravity
10 optical axis
11 holding device
11*a* inner contour of the holding device
12 pin
13 first threaded ring
14 second threaded ring
15*a*, 15*b* arrows
L longitudinal direction
A, R arrows

The invention claimed is:

1. A camera system (1, 1') comprising:
a housing (2); and
an optoelectronic sensor unit (3), arranged in the housing (2), having at least one detector device (4) and at least one optical unit (5) connected upstream of the at least one detector device (4), the optoelectronic sensor unit defining an optical axis,
wherein the optoelectronic sensor unit (3) is elastically fixed to the housing (2),
at least one first elastic mounting device (6.1-6.7) is formed from multiple ring segments (6.10-6.70) arranged spaced apart from one another, and
the at least one first elastic mounting device being connected to the optoelectronic sensor unit and extending radially outward therefrom to connect the optoelectronic sensor unit to the housing,
wherein the at least one first elastic mounting device (6, 6.1, 7) is provided, via which the optoelectronic sensor unit (3) is connected to the housing (2) or to a ring-shaped holding device (11), which is, in turn, connected to the housing (2),
wherein the at least one first elastic mounting device (6.1) is arranged between the ring-shaped holding device (11) and a first threaded ring (13) for fixation,
wherein a second threaded ring (14) is displaceably arranged between the ring-shaped holding device (11) and the first threaded ring (13), by which a metallic outer ring or a metallic outer ring segment (6.10*b*) is displaceable along an inner contour (11*a*) of the ring-shaped holding device (11) such that pressure exerted on a ring-shaped elastomer element or an elastomer ring segment (6.10*c*) is changeable in a longitudinal direction (L) with respect to its cross section.

2. The camera system (1, 1') as claimed in claim 1, wherein the optoelectronic sensor unit (3) is connected, via the at least one first elastic mounting device (6) and at least one second elastic mounting device (7), to the housing (2).

3. The camera system (1, 1') as claimed in claim 2, wherein the elastic mounting devices (6, 7) are designed to have an internal geometry such that the elastic mounting devices (6, 7) have an essentially equal rigidity and/or damping in three spatial directions.

4. The camera system (1) as claimed in claim 2, wherein the elastic mounting devices (6, 7) are embodied as ring-shaped.

5. The camera system (1, 1') as claimed in claim 1, wherein the at least one first elastic mounting device (6) connects the optoelectronic sensor unit (3) to the housing (2), in a region of the at least one optical unit (5), and/or at least one second elastic mounting device (7) connects the optoelectronic sensor unit (3) to the housing (2) in a region of the at least one detector device (4).

6. The camera system (1, 1') as claimed in claim 5, wherein a center of gravity (9) of the optoelectronic sensor unit (3) lies on the optical axis (10) of the optical unit (5) at least approximately in a center axially between the at least one first elastic mounting device (6) and the at least one second elastic mounting device (7).

7. The camera system (1, 1') as claimed in claim 1, wherein the optoelectronic sensor unit (3) forms a resonator.

8. The camera system (1') as claimed in claim 1, wherein the second threaded ring (14) comprises an external thread and an internal thread, which have different rotational directions.

9. The camera system (1') as claimed in claim 1, wherein the ring segments (6.30, 6.50) of the at least one first elastic mounting device (6.3, 6.5) are arranged in multiple groups of two or three ring segments (6.30, 6.50).

10. The camera system (1') as claimed in claim 9, wherein the ring segments (6.10-6.70) or the groups of ring segments (6.30, 6.50) are arranged at uniform intervals along an internal diameter of the ring-shaped holding device (11).

11. A camera system (1, 1') comprising:
- a housing (2); and
- an optoelectronic sensor unit (3), arranged in the housing (2), having at least one detector device (4) and at least one optical unit (5) connected upstream of the at least one detector device (4),
- wherein the optoelectronic sensor unit (3) is elastically mounted in relation to the housing (2),
- the optoelectronic sensor unit (3) is connected, via at least two ring-shaped elastic mounting devices (6, 7), to the housing (2), and
- the ring-shaped elastic mounting devices (6, 7) each comprise at least the following:
  - a metallic inner ring (6a, 7a) which is arranged on the optoelectronic sensor unit (3);
  - a metallic outer ring (6b, 7b) which is arranged on the housing (2); and
  - a ring-shaped elastomer element (6c, 7c), formed from rubber, which via the metallic inner ring (6a, 7a) is connected to the metallic outer ring (6b, 7b), and
- at least one ring-shaped elastic mounting device (6.1-6.7) of the at least two ring-shaped elastic mounting devices (6, 7) is formed from multiple ring segments (6.10-6.70) arranged spaced apart from one another.

12. The camera system (1) as claimed in claim 11, wherein the ring-shaped elastomer element (6c, 7c) is fastened by vulcanization on the metallic inner ring (6a, 7a) and/or on the metallic outer ring (6b, 7b).

13. The camera system (1') as claimed in claim 11, wherein a pre-tension of the ring-shaped elastomer element or an elastomer ring segment (6.10c) is variably settable.

14. The camera system (1') as claimed in claim 13, wherein the pre-tension is variably settable by a changeable compression of the ring-shaped elastomer element or the elastomer ring segment (6.10c) in a longitudinal direction (L) with respect to its cross section.

15. A camera system (1, 1') comprising:
- a housing (2); and
- an optoelectronic sensor unit (3), arranged in the housing (2), having at least one detector device (4) and at least one optical unit (5) connected upstream of the at least one detector device (4),
- wherein the optoelectronic sensor unit (3) is elastically mounted in relation to the housing (2),
- at least one elastic mounting device (6.1-6.7) is formed from multiple ring segments (6.10-6.70) arranged spaced apart from one another, and
- the ring segments (6.10-6.70) each comprise at least the following:
  - a metallic inner ring segment (6.10a) which is arranged on the optoelectronic sensor unit (3);
  - a metallic outer ring segment (6.10b) which is arranged on the housing (2) or on the ring-shaped holding device (11) connected to the housing (2); and
  - an elastomer ring segment (6.10c), formed from rubber, via which the metallic inner ring segment (6.10a) is connected to the metallic outer ring segment (6.10b).

* * * * *